March 6, 1962　　H. F. GEIER ETAL　　3,023,455
MIXERS
Filed March 9, 1959　　　　　　　　　　2 Sheets-Sheet 2
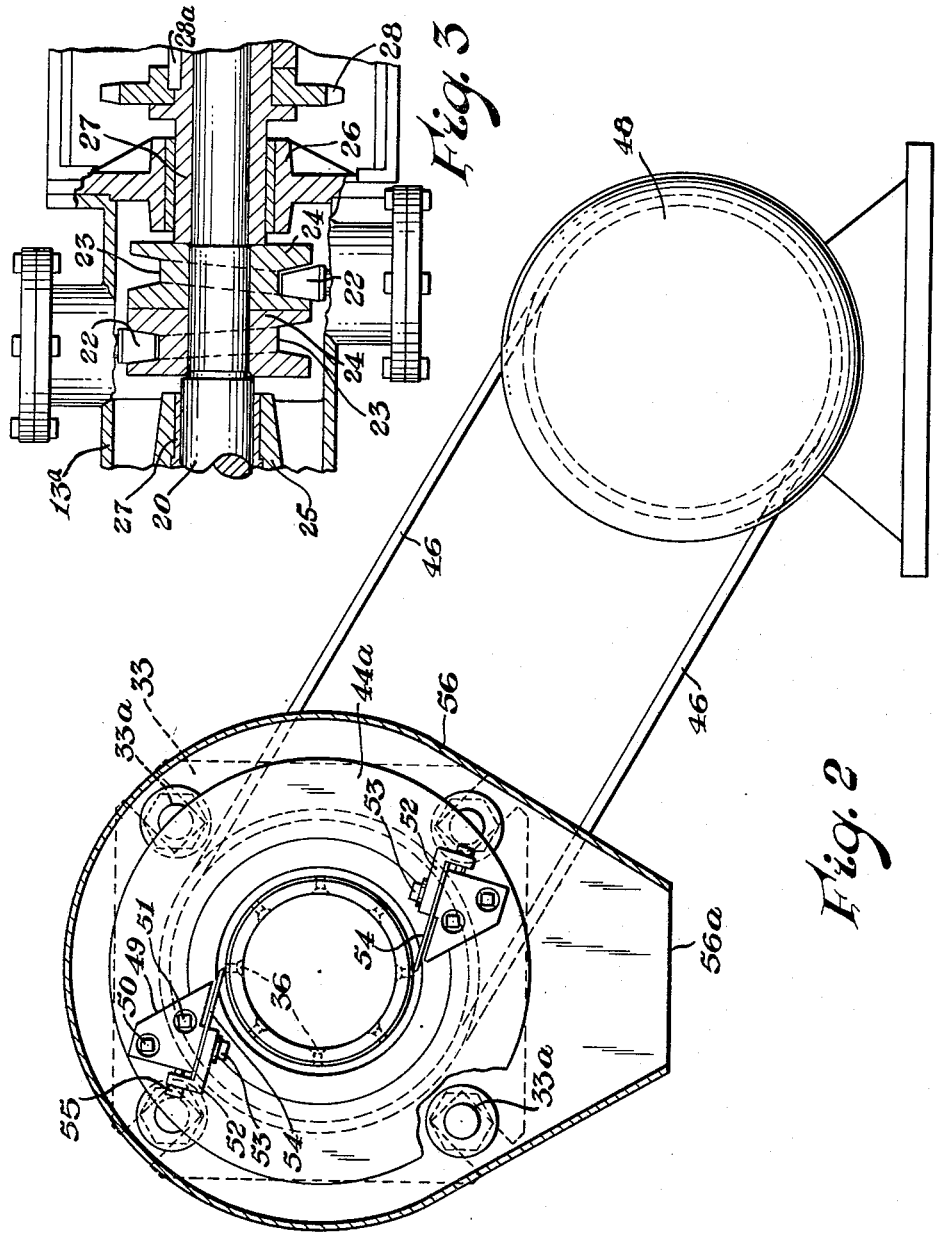
INVENTORS.
Herbert F. Geier
BY Henry F. Irving
ATTORNEYS

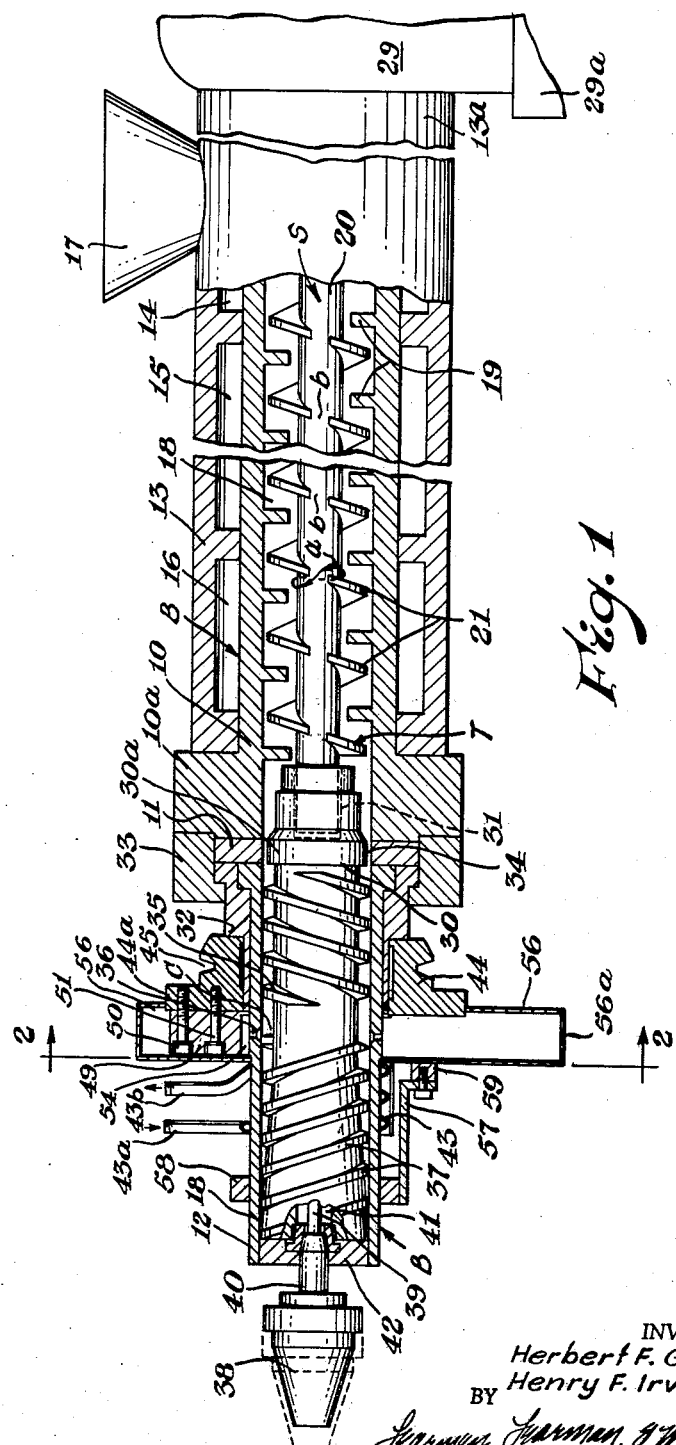

3,023,455
MIXERS

Herbert F. Geier, 9 Aberdeen Place, Fairlawn, N.J., and Henry F. Irving, 301 Garden Lane, Saginaw, Mich.
Filed Mar. 9, 1959, Ser. No. 798,281
8 Claims. (Cl. 18—12)

This invention relates to mixers and more particularly to continuous mixers which thoroughly intermix plastic materials and the like and deliver them in solidified, homogeneously blended granules or pellets.

It is a principal object of the present invention to design a continuous mixer, having a plurality of peripherally disposed extrusion ports associated with suitable knife mechanism for cutting the plastic ribbons issuing from the ports into pellets, in which a steady and constant flow of material to the ports is assured so that pellets of uniform size can be obtained. It is important that the product be uniform so that errors in proportioning in subsequent processing can be held to a minimum. Briefly, the instant invention in one aspect thereof is concerned with means disposed on opposite sides of the circumferentially spaced extension ports for feeding the material in opposite directions during the reciprocatory stroke of the mixer shaft. Thus during the forward stroke of the mixer, when the material is being moved bodily as a mass in a forward direction, back pressures are created which provide an uninterrupted flow of material to the extrusion ports.

A further object of the invention is to provide a mixer of simple and reliable construction which is not of undue length considering the mixing operation which is expected of it and can be economically manufactured and operated.

Another object of the invention is to provide a mixer of the character described in which material is delivered from a mixing and kneading zone through a reduced orifice to an extrusion zone in a manner which requires a minimum amount of power.

A further object of the invention is to provide a high production rate mixer in which there is a better and more efficient control of the quality of the product, and a high degree of blend is achieved with a relatively short retention time.

With the above and other objects in view, the present invention consists in the combination and arrangement of parts herinafter more fully described, illustrated in the accompanying drawing, and more particularly pointed out in the appended claims, it being understood that equivalent changes may be made in the various elements which comprise the invention without departing from the spirit thereof or the scope of the appended claims.

In the drawings,

FIGURE 1 is a partly sectional, side elevational view of the mixer with the mixing shaft shown in rearward position, the diagrammatic lines at the left end of the view indicating the extent of the forward movement of the mixing shaft in its reciprocatory stroke;

FIGURE 2 is an enlarged, front end elevational view taken on the line 2—2 of FIGURE 1, depicting the manner in which the cut-off knives sever the extruding ribbons into pellets of uniform size; and FIGURE 3 is a sectional, side elevational view illustrating the manner in which the mixing shaft may be simultaneously revolved and reciprocated.

Referring now more particularly to the accompanying drawings, in which only a preferred embodiment of the invention is illustrated, a letter B generally refers to a tubular mixing barrel which is, in the instant form of the invention, formed by sections 10, 11 and 12. Provided on the section 10 in the usual manner is a jacket 13 which may have a plurality of individual chambers 14, 15, and 16 which can be maintained at different temperature levels by circulating hot or cold fluids, depending on the mixing operation, through the chambers individually.

A feed hopper 17 leads into the chamber or bore 18 of the barrel B which, as shown, has circumferentially spaced, longitudinally extending rows of axially spaced kneading teeth 19 within the section 10. The mixing shaft S, which is suitably journaled concentrically within the barrel B, has a rear section 20 provided with interrupted helical threads or blades T forming thread sections 21 which cooperate with the teeth 19 in the mixing and kneading of the material introduced to the chamber 18 through the feed hopper 17. The thread portions 21 are so pitched that, if shaft S is revolved in a clockwise direction as viewed from the right end of the machine (see the arrow "a"), the material will be moved forwardly from right to left. In this continuous machine the mixing shaft S is also reciprocated in timed relation with its rotation so that the teeth 19, during the srtoke of the shaft, pass through the spaces "b" between the thread portions 21. If the threads or blades which form thread portions 21 are interrupted at 180° intervals, then the shaft S must, of course, rotate 180° during both the forward and rearward portions of the reciprocatory stroke.

In this mixing operation in which the stationary teeth 19 on the barrel actually pass through the interruptions in the thread of the screw, some of the material is always held back by each of the fixed teeth to mix with the material behind. Instead of batches of material being conveyed through its disk form, the material is conveyed through the mixing and kneading zone enclosed by barrel section 10 in loops and there are no dead spaces wherein unmixed material can remain.

As shown in FIGURE 3, the housing 13a rearwardly of the feed hopper 17 is provided with a pair of fixed cam follower projections 22 which ride in cam tracks 23 provided in a pair of side-by-side cams 24 which are keyed on the rear end of mixer shaft 20 as shown. As the shaft 20 is revolved by a motor through a suitable gear reduction unit the rotary travel of the cams 24, which are fixed on shaft 20, causes the shaft 20 to have an oscillating stroke. At its rear end the shaft portion 20 is supported in bearings 25 and 26 which are supported by the casing 13a. Fixed to the shaft portion 20 as shown to revolve and reciprocate with it are wear sleeves 27. An axially stationary gear 28 keyed as at 28a on the rear slide bearing 27 is connected through a suitable gear reduction unit to the drive motor and drives the rear sleeve 27 and shaft 20. The gear reduction unit and motor may be housed in a suitable casing 29 mounted on base 29a.

At its front end the shaft portion 20 is fixed to a second mixer shaft section 30 which has a threaded bore 31 to receive mating threads on the front end of shaft section 20, the cooperating threads on the front end of shaft section 20 and in bore 31 being of opposite hand relative to the rotation of shaft S so that the connection tends to tighten with rotation rather than loosen. Provided to secure the sections 11 and 12, and a collar member 32, to the barrel section 10 is a slotted retaining plate 33 which may be bolted as at 33a to the enlarged shoulder or flange 10a of the barrel section 10. From what may be termed primarily a mixing zone within section 10, the material passes through a reduced annular orifice 34 formed by barrel section 11 and an enlarged portion 30a of shaft 30 to forwardly pitched, continuous helical threads or blades 35 whose function it is to advance the material, while at the same time achieving some mixing action, to an extruding zone "c" within the barrel section 12. Barrel section 12 is at this point provided with a plurality of circumferentially spaced, reduced extrusion orifices 36.

It is important to note that the diameter of the bore of the barrel section at ring 34 is no less than the bore of the adjacent portions of barrel sections 10 and 12 and the diameter of section 30a is no greater than the bore of the adjacent portions of barrel sections 10 and 12 so that the shaft 30 does not act as a ram in the sense that it is compressing the material in its reciprocatory stroke. Thus, the motor driving shaft S will require considerably less power than if the portion 30a or threads 35 were ramming the material and a more efficient operation is achieved. Further, control of the operation is possible with the width of passage 34 gauged to provide the desired mixing action within barrel section 10 and a proper flow to blades 35 in view of the diameter of orifices 36.

Continuous helical blades or threads 37 are provided on the shaft section 30, which tapers toward its front end as shown, and these threads or blades 37 tend to feed material rearwardly back into zone "c" even during the forward stroke of the mixing shaft S. The back pressure developed by threads 37 in tests which have been conducted has proven adequate to provide a steady and continuous extrusion of the plastic material out extrusion orifices 36 during both the forward and return strokes of the mixing shaft S. The blades 35 and 37 terminate at a spaced distance apart sufficient so that the terminal edge of the forward-most thread 35 will not quite reach the orifices 36 on the forward stroke of the shaft S. As shown in FIGURE 1, the blades 37 further do not quite extend to the ports 36 when the shaft S is in its rear position and thus at no time do the blades 35 or 37 isolate the ports 36 from the mass of material in zone "c."

In order to maintain the plastic in barrel section 12 at the desired temperature, a rotary joint 38 may be employed which has an inner pipe 39 and a surrounding outer pipe 40. The shaft portion 30 is bored as at 41 to receive fluid from the pipe 39 near its rear end and circulate it back to the return portion 40 of the joint 38. A cap or end plate 42 fixed to the shaft section 30 supports the joint 38 in place. Also circulating fluid conducting coils 43, having an inlet connection 43a and an outlet connection 43b, can be supported on the barrel section 12 as shown.

Rotatably supported on the collar 32 is a pulley member 44 having a groove 45 around which a V-belt 46 (FIGURE 2) from the drive pulley of a drive motor 48 may be trained. Member 44 has a flange section 44a mounting knife blocks 49 by means of bolts 50 and 51 as shown. Angle members 52 have bolts 53 extending through slotted portions of the blades 54 which accordingly may be adjusted back and forth. Also, a set screw 55 may be used to adjust each blade 54 so that its cutting edge 55 is disposed just out of contact with the peripheral portion of barrel 12 through which the extrusion orifices 36 extend. With the knives 54 being revolved at the desired rate of speed on barrel section 12 the plastic continually extruding through orifices 36 will be cut into pellets of uniform length so long as the supply of material to the orifices 36 remains constant. A pellet collecting hood member 56 having a discharge opening 56a can be supported by means of brackets 57 from a ring 58 on barrel section 12, the housing 56 carrying blocks 59 to which the brackets 57 can be bolted as shown.

In operation, material is fed continuously to the machine in proportionate quantities through the feed hopper 17. For instance, it may be desirable to mix a measured amount of carbon with a plastic such as polyethylene and, although the retention time in the machine is relatively short, a thorough mixing can be accomplished. A hot fluid piped through chambers 14, 15, and 16 will soon reduce the material to the desired degree of plasticity as it proceeds through the primary mixing chamber defined by barrel section 10. When the shaft S is moved forwardly, obviously the mass at the inlet 17 is moved forwardly except for the portion which is detained by the teeth 19. At the same time, the rotation of shaft S will assure a thorough mixing and kneading action.

From the zone of primary mixing in barrel section 10, the material moves through the reduced annulus 34 which conducts a measured amount thereof to a secondary advancing and mixing zone in which the threads or blades 35 operate to feed the material to the extrusion zone "c." During the stroke of shaft sections 20 and 30 the rotation of the threads or blades 37 assures a constant and uniform flow of material through the expressing orifices 36. The speed of rotation of the member 44 which carries knives 54 will be gauged to the length of pellets it is desired to obtain. The material is retained in a desirable plasticized state while in barrel section 12 by the coils 43 and the rotary joint assembly 38. It is believed clear that the instant machine will find wide use in the plastics and allied industries and will be found suitable for processing a variety of materials.

It is to be understood that various elements may be substituted for the elements which are described and claimed to accomplish the same or similar results without departing from the spirit of the invention or the scope of the appended claims.

We claim:

1. In a mixer; stationary barrel means; means near one end thereof for feeding plastic material into said barrel means; said barrel means having peripherally spaced, plastic pellet ribbon expressing ports therein near the opposite end thereof; reciprocable and rotatable mixing shaft means within said barrel means having forwardly pitched, helical blades thereon for mixing plastic material and conveying it forwardly along said barrel means; said forwardly pitched blades terminating adjacent said ports rearwardly thereof; rearwardly pitched, helical blades adjacent and on the opposite side of said radial ports from said forwardly pitched blades; means for reciprocating and rotating said mixing shaft means relative to said barrel means; and rotatable knife means mounted adjacent said radial ports for cutting the plastic expressed through said ports into pellets of uniform size.

2. The combination defined in claim 1 in which the axial space between said forwardly and rearwardly pitched blades is predetermined relative to the stroke of said mixing shaft means so that said forwardly pitched blades terminate just short of said ports axially when the shaft means is in forward position and the rearwardly pitched blades terminate axially just short of said ports when the shaft means is in rearward position.

3. In a mixer; longitudinally extending barrel means having radial, plastic pellet ribbon expressing ports; mixing shaft means extending longitudinally within said barrel means and having at least relative reciprocable movement therewith; first blade means within said barrel means rearwardly of the said ports pitched for creating an advancing pressure for moving material forwardly; second blade means within said barrel means immediately forwardly of said ports pitched and spaced from said first blade means for creating back pressure in a direction opposite to said advancing pressure and causing said material to be expressed radially from said ports regardless of the relative axial position of the mixing shaft means and barrel means; said blade means for moving material forwardly and blade means for creating back pressure being spaced from said ports a distance axially such that the said relative reciprocable movement does not dispose either of said blade means in radial alignment wtih said ports and means mounted adjacent said expressing ports and having relative movement therewith for cuting plastic expressed through said ports into pellets of uniform size.

4. In a mixer; longitudinally extending, fixed barrel means; means leading to the interior of said barrel means for supplying plastic material thereto; said barrel means having spaced radial plastic pellet ribbon expressing ports remote from said means leading to its interior; mixing shaft means extending longitudinally within said barrel means and having at least relative axial movement therein for mixing the material and creating an advancing pressure moving it forwardly to said ports; said mixing shaft means extending longitudinally forwardly of said ports; means incorporated with said shaft means forwardly of the said ports for moving the material rearwardly and creating a back pressure opposite to the advancing pressure causing said material to be expressed radially from said ports regardless of the relative position of the mixing shaft in the barrel means; and cut-off means mounted adjacent said barrel means having relative movement with said ports for cutting plastic expressed through said ports into pellets of uniform size.

5. In a mixer; an elongate, tubular barrel having a continuous bore defining a mixing chamber; an axially disposed mixing shaft rotatably mounted in said barrel having interrupted helical threads forming thread portions thereon; axially spaced lugs on the interior wall of said barrel between said threads in one position of said shaft; means for simultaneously rotating and reciprocating said shaft relative to said barrel to permit said thread portions to pass by said lugs during the forward and rearward movement of said mixing shaft; an enlarged head on said shaft forwardly of said threads and lugs defining a reduced passage between said head and interior wall of the barrel, the interior diameter of the barrel at said passage being of substantially the same diameter as the diameter of the portion of the barrel housing in which said interrupted threads and lugs are disposed and no less than the adjacent diameter of the barrel forwardly of the passage; forwardly pitched threads on said shaft forwardly of the reduced passage, terminating rearwardly of the front end of the mixing shaft; circumferentially spaced ports in said barrel forward of said latter forwardly pitched threads, and rearwardly pitched threads on said shaft forwardly of said ports to move material rearwardly and build up a back pressure expressing plastic material from said ports; a rotary cutting head mounted on said barrel; cut-off knives on said cutting head adjacent said ports for cutting plastic expressed from said ports into pellets of uniform size; and means for revolving said cutting head relative to said barrel.

6. The combination defined in claim 5 in which said cutting head has a pulley portion integrated therewith and said means driving the cutting head includes a drive belt member.

7. In a mixer; a longitudinally disposed barrel bored to provide a mixing chamber; means leading to the interior of the barrel to pass material to the mixing chamber; an axially disposed mixing shaft rotatably mounted in said barrel having interrupted helical threads forming thread portions thereon; axially spaced segments on the interior wall of said barrel; means for simultaneously rotating and reciprocating said shaft relative to said barrel to permit said thread portions to pass by said segments during the forward and rearward movement of said mixing shaft; an enlarged, cylindrical portion on said shaft forwardly of said interrupted threads and segments defining a reduced, metering passage between said portion and interior of the barrel; the diameter of the bore of the barrel at said passage being substantially no less than the diameter of the adjacent bore of the barrel forwardly and rearwardly thereof; an advancing thread on said shaft forwardly of said cylindrical portion; peripheral, plastic pellet ribbon expressing, ports in said barrel forwardly of said advancing thread for extruding the material; and an oppositely pitched thread on said shaft forwardly of said ports for creating a back pressure providing uniform expression of material from said ports.

8. In a mixer; a longitudinally disposed barrel bored to provide a mixing chamber; means leading to the interior of the barrel to pass material to the mixing chamber; an axially disposed mixing shaft rotatably mounted in said barrel and having interrupted helical threads forming thread portions thereon; axially spaced segments on the interior wall of said barrel; means for simultaneously rotating and reciprocating said shaft relative to said barrel to permit said thread portions to pass by said segments during the forward and rearward movement of said mixing shaft; an enlarged, cylindrical portion on said shaft forwardly of said interrupted threads and segments defining a reduced passage between said portion and interior of the barrel; the diameter of the said cylindrical portion being less than the diameter of the bore of the barrel forwardly and rearwardly adjacent said cylindrical portion to avoid said cylindrical portion functioning as a ram during the reciprocatory movement; plastic ribbon expressing orifices in said barrel forwardly of said reduced passage for extruding the material; and blade means on said shaft forwardly of said orifices pitched oppositely to said helical threads for creating a back pressure providing uniform expression of material from said ports.

References Cited in the file of this patent

UNITED STATES PATENTS

| 2,127,857 | Bond | Aug. 23, 1938 |
| 2,319,859 | Hale | May 25, 1943 |
| 2,370,952 | Gordon | Mar. 6, 1945 |
| 2,407,503 | Magerkurth et al. | Sept. 10, 1946 |
| 2,453,088 | Dulmage | Nov. 2, 1948 |
| 2,810,159 | Teichmann | Oct. 22, 1957 |
| 2,868,517 | Lasch | Jan. 13, 1959 |
| 2,970,341 | Mallory et al. | Feb. 7, 1961 |

FOREIGN PATENTS

| 626,067 | Great Britain | July 8, 1949 |